United States Patent
Suzumura et al.

(10) Patent No.: US 9,470,434 B2
(45) Date of Patent: Oct. 18, 2016

(54) MULTIPLEX PIPE AND SYSTEM FOR RECOVERING STEAM FROM GEOTHERMAL WELLS

(71) Applicants: Nippon Steel & Sumikin Engineering Co., Ltd., Tokyo (JP); Nippon Steel & Sumitomo Metal Corporation, Tokyo (JP)

(72) Inventors: Keita Suzumura, Tokyo (JP); Masayuki Igarashi, Fukuoka (JP); Akihiro Itoh, Fukuoka (JP); Akira Kawakami, Tokyo (JP); Hideki Fujii, Tokyo (JP); Teruhiko Hayashi, Tokyo (JP); Kazuhiro Takahashi, Tokyo (JP)

(73) Assignee: Nippon Steel & Sumikin Engineering Co., Ltd. (JP)

( * ) Notice: Subject to any disclaimer, the term of this patent is extended or adjusted under 35 U.S.C. 154(b) by 0 days.

(21) Appl. No.: 14/423,742

(22) PCT Filed: May 28, 2013

(86) PCT No.: PCT/JP2013/064689
§ 371 (c)(1),
(2) Date: Feb. 25, 2015

(87) PCT Pub. No.: WO2014/034202
PCT Pub. Date: Mar. 6, 2014

(65) Prior Publication Data
US 2015/0226463 A1      Aug. 13, 2015

(30) Foreign Application Priority Data

Aug. 29, 2012   (JP) .................. 2012-189184

(51) Int. Cl.
*F24J 3/08*    (2006.01)
*F16L 9/19*    (2006.01)
*E21B 21/12*   (2006.01)

(52) U.S. Cl.
CPC ............... *F24J 3/085* (2013.01); *E21B 21/12* (2013.01); *F16L 9/19* (2013.01); *F24J 3/086* (2013.01); *Y02E 10/14* (2013.01); *Y02E 10/16* (2013.01)

(58) Field of Classification Search
CPC ............. F24J 3/085; F24J 3/086; F16L 9/19; F28D 20/0052; Y02E 10/14; Y02E 10/16; E21B 21/12
USPC .............. 165/45; 60/641.2, 641.3; 166/272.4
See application file for complete search history.

(56) References Cited

U.S. PATENT DOCUMENTS 3,786,858 A * 1/1974 Potter et al. .................... 165/45
4,030,549 A * 6/1977 Bouck ......................... 166/280.1

(Continued)

FOREIGN PATENT DOCUMENTS

| JP | 56-146585 | 11/1981 |
|---|---|---|
| JP | 58-44278 | 3/1983 |

(Continued)

OTHER PUBLICATIONS

Lichti, K.A., et al., "Acid Well Utilization Study: Well MG-9D, Phillipines", Apr. 2010, Proceedings World Geothermal Congress 2010, pp. 1-3.*

(Continued)

*Primary Examiner* — Tho V Duong
*Assistant Examiner* — Raheena Rehman
(74) *Attorney, Agent, or Firm* — McCarter & English, LLP (57) ABSTRACT

Provided is a multiplex pipe and a system for recovering steam from a geothermal well, which are capable of solving all of the various problems with a neutralization pipe prepared by painting or the like of an alkali-resistant coating on the inner face of an acid-resistant single pipe. A multiplex pipe 10 that is configured to recover steam from a geothermal well GT, includes: a casing pipe 1 located outside; and a duplex pipe 4 that is slidable relative to the casing pipe 1 in the casing pipe 1, and has a first gap 5 with an inner face of the casing pipe 1, the duplex pipe including an outer pipe 2 having acid-resistance and an inner pipe 3 having alkali-resistance, the outer pipe 2 and the inner pipe 3 defining a second gap 6 therebetween. An alkali solution is injected to acid hot-water stored in an acid geothermal well GT via a hollow 7 of the inner pipe 3 to neutralize the acid hot-water, and the neutralized hot-water V is allowed to spout to the ground via the first gap 5, thus recovering flashing steam.

19 Claims, 3 Drawing Sheets

(56) References Cited

U.S. PATENT DOCUMENTS

| | | | |
|---|---|---|---|
| 4,500,434 A * | 2/1985 | Jost et al. | 210/696 |
| 4,512,156 A * | 4/1985 | Nagase | 60/641.2 |
| 4,924,679 A * | 5/1990 | Brigham et al. | 62/50.7 |
| 5,005,644 A * | 4/1991 | Wall et al. | 166/270.1 |
| 5,370,182 A * | 12/1994 | Hickerson | 166/401 |
| 5,656,172 A * | 8/1997 | Kitz et al. | 210/696 |
| 6,035,949 A * | 3/2000 | Altschuler et al. | 175/19 |
| 6,073,695 A | 6/2000 | Crawford et al. | |
| 2008/0073058 A1* | 3/2008 | Ueyama | 165/45 |
| 2011/0011557 A1* | 1/2011 | Shelton, Jr. | 165/45 |
| 2012/0018120 A1* | 1/2012 | Danko | 165/45 |
| 2013/0101492 A1* | 4/2013 | McAlister | 423/418.2 |

FOREIGN PATENT DOCUMENTS

| | | | |
|---|---|---|---|
| JP | 63-176894 | | 7/1988 |
| JP | 3-268940 | | 11/1991 |
| JP | 03268940 A | * | 11/1991 |
| JP | 7-180793 | | 7/1995 |
| JP | 2000-161198 | | 6/2000 |

OTHER PUBLICATIONS

Lichti, K.A., et al., "Acid Well Utilisation Study: Well MG-9D, Philippines"; Proceedings World Geothermal Congress 2010, Apr. 2010, Bali, Indonesia, pp. 1-11.

Moya, Paul et al., "Performance of Calcium Carbonate inhibition and Neutralization Systems for Production Wells at the Miravalles Geothermal Field", Proceedings World Geothermal Congress 2010, Apr. 2010, Bali, Indonesia, pp. 1-10.

Al-Ontari, Ahmad S., et al., "Case Studies and Best Practices of Refinery Caustic Injection Systems", Saudi Aramco Journal of Technology, Summer 2008, pp. 29-36.

* cited by examiner

MULTIPLEX PIPE AND SYSTEM FOR RECOVERING STEAM FROM GEOTHERMAL WELLS

TECHNICAL FIELD

The present invention relates to a multiplex pipe including: a duplex pipe configured to neutralize acid hot-water stored in an acid geothermal well by injecting an alkali solution into the geothermal well; and a casing pipe configured to let the neutralized hot-water spout to the ground, thus recovering flashing steam, and a system provided with this multiplex pipe.

BACKGROUND ART

Although geothermal wells have different pH values from place to place, when a geothermal well spouts a strong-acid geothermal fluid, the development of such a geothermal well is usually stopped. Among acid geothermal fluids of pH 7 or less, "a strong-acid geothermal fluid" herein refers to a fluid of pH 5 or less, which is known to corrode carbon steel materials badly. As a rare example, however, steam is produced by injecting an alkali solution into such a geothermal well to neutralize acid hot water, examples of which are introduced in Non-Patent Literatures 1 to 3.

Such an acid geothermal well typically has a high-temperature strong-acid atmosphere at temperatures of about 200 to 300° C. and having pH of about 2, whereas an alkali solution to be injected is a high-density solution of 20 to 50 mass %, having pH up to 14 in some cases.

A solution injection pipe that is used for the injection of such an alkali solution is called a neutralization pipe as well because it is inserted in a casing pipe for injection of an alkali solution into an acid geothermal well for neutralization, which is typically a single pipe made of Ni-based alloy because it has to have both of acid resistance and alkali resistance.

However, it is known that such a single pipe made of Ni-based alloy does not have sufficient corrosion resistance in a high-temperature strong-acid atmosphere of a geothermal well, and so currently such a single pipe made of Ni-based alloy is used while being replaced in a relatively short period, such as one to two months. Currently therefore the cost required for the replacement of a single pipe is a big problem.

Then, the usage of a single pipe made of a Ti-base material, which can be resistant to a high-temperature strong-acid environment as well, may be considered. Ti, however, is susceptible to corrosion in a high-temperature alkali environment, and so a countermeasure will be needed, such as the formation of a coating made of a high-temperature alkali resistive material on the inner face of the single pipe through which an alkali solution flows.

Patent Literatures 1 and 2, for example, disclose the technique of painting with fluorine resin as a high-temperature alkali resistive material on the inner face of a titanium pipe. Patent Literature 3 discloses a coated pipe prepared by applying a coating of fluorine resin to the inside of a metallic pipe.

The techniques of painting fluorine resin or of applying a coating of fluorine resin to the inside of a single pipe as disclosed in Patent Literatures 1 to 3 have the following problems.

That is, one of the problems resides in that there is no technique established, of applying a coating of fluorine resin of a desired thickness (e.g., 0.2 mm or more) on the inner side of a long steel pipe that is relatively thin of 50 mm or less in diameter and extends up to 2,000 to 3,000 m without pinholes.

Another problem resides in that water in an alkali solution may permeate through the fluorine resin layer and may be accumulated at the contact interface between the fluorine resin layer and the steel pipe, and such a solution accumulated gradually may increase in size and may damage the fluorine resin layer or the fluorine resin layer may swell to block the hollow inside of the single pipe and so inhibit the flow of the alkali solution.

Still another problem resides in that, if the neutralization pipe is partly damaged, the inserted pipe as a whole extending up to 2,000 to 3,000 m has to be removed out to the ground irrespective of the site of the damage, which then has to be replaced with a new neutralization pipe.

CITATION LIST

Non Patent Literatures

Non Patent Literature 1: Proceedings World Geothermal Congress 2010, Acid Well Utilisation Study: Well MG-9D, Philippines
Non Patent Literature 2: Proceedings World Geothermal Congress 2010, Performance of Calcium Carbonate Inhibition and Neutralization Systems for Production Wells at the Miravalles Geothermal Field
Non Patent Literature 3: SAUDI ARAMCO OF TECHNOLOGY SUMMER 2008, Case Studies and Best Practices of Refinery Caustic Injection Systems

Patent Literatures

Patent Literature 1: JP H3-268940 A
Patent Literature 2: JP S63-176894 A
Patent Literature 3: JP H7-180793 A

SUMMARY OF INVENTION

Technical Problem

In view of the aforementioned problems, the present invention aims to provide a multiplex pipe and a system for recovering steam from a geothermal well, which is capable of solving all of the various problems with a neutralization pipe prepared by painting or the like of an alkali-resistant coating on the inner face of an acid-resistant single pipe, that is, no established techniques being available to apply a coating on a steel pipe that is relatively thin of 50 mm or less in diameter and is long (2,000 to 3,000 m) without pinholes and with desired thickness and strength, permeated water through the coating and accumulated at the contact interface, which may swell and block the hollow inside of the neutralization pipe, and if the neutralization pipe is partly damaged, the necessity to replace the neutralization pipe as a whole.

Solution to Problem

In order to achieve the aim, a multiplex pipe of the present invention configured to recover steam from a geothermal well includes: a casing pipe located outside; and a duplex pipe that is slidable relative to the casing pipe in the casing pipe, and has a first gap with an inner face of the casing pipe, the duplex pipe including an outer pipe having acid-resistance and an inner pipe having alkali-resistance, the outer pipe and the inner pipe defining a second gap therebetween. An alkali solution is injected to acid hot-water stored in an acid geothermal well via an interior of the inner pipe to neutralize the acid hot-water, and the neutralized hot-water is allowed to spout to the ground via the first gap, thus recovering flashing steam.

One of the features of the multiplex pipe of the present invention resides in that it includes the casing pipe located outside and made of a steel pipe or the like, and the duplex pipe located inside instead of a conventional neutralization pipe that is a single pipe that does not have sufficient alkali-resistance and acid-resistance.

The outer pipe of the duplex pipe is an acid-resistant pipe and the inner pipe located inside is an alkali-resistant pipe. For instance, in one embodiment of the outer pipe and the inner pipe, the outer pipe includes an alloy containing titanium as a main component, and the inner pipe contains a fluorine-based resin.

That is, instead of forming a coating made of an alkali-resistant material on the inner face of a single pipe, it adopts the duplex pipe including the inner pipe having alkali resistance inside of the outer pipe having acid resistance, and so a protective layer (pipe) made of an alkali-resistant material and of a thickness that cannot be achieved by the conventional coating techniques can be provided inside of the acid-resistant pipe that is relatively thin of 50 mm or less in diameter and is long up to 2,000 to 3,000 m so as to realize desired strength and durability.

A gap (second gap) is provided between the outer face of the inner pipe having alkali-resistance and the inner face of the outer pipe having acid-resistance, these pipes making up the duplex pipe, which can facilitate the insertion of the inner pipe. Further, since the inner pipe has sufficient strength as compared with the coating of the conventional techniques and since an escape route for the accumulated solution is ensured, damages and blocking of the flow channel of the inner pipe will hardly occur even when water in the alkali solution supplied via the inner pipe permeates through the inner pipe and is accumulated at the second gap and gradually increases in volume.

In a preferable embodiment of the multiplex pipe configured to recover steam from a geothermal well, in the duplex pipe, a forward end of the inner pipe protrudes from a forward end of the outer pipe.

In the case of a duplex pipe whose inner pipe does not protrude from the forward end of the outer pipe, the forward end portion of the outer pipe will be likely to be exposed to the alkali solution discharged or the alkali environment that is formed by the solution when the alkali solution is discharged from the inner pipe while immersing the forward end of the duplex pipe in acid hot-water, and so it is difficult to avoid corrosion of the outer pipe. On the other hand, in the configuration where the forward end of the inner pipe protrudes from the forward end of the outer pipe, the forward end portion of the outer pipe will not be exposed to the alkali solution injected from the inner pipe to the geothermal well, and the problem of corrosion of the outer pipe due to the alkali solution can be solved effectively.

For the wording "a forward end of the inner pipe protrudes from a forward end of the outer pipe", the protruding length of the forward end of the inner pipe is not limited especially. In general, whereas a geothermal fluid constituting a strong-acid geothermal well has a specific gravity of about 1.0 (about 0.968 at 100° C. and 0.85 at 200° C.) at normal temperatures, which varies with various ions and gases, an alkali solution containing sodium hydroxide and the like has a specific gravity of 1.525 at normal temperatures when the content of the solution is 50 mass %. In this way, the specific gravity of an alkali solution is relatively high. This means that, when the forward end of the inner pipe protrudes from the forward end of the outer pipe even slightly, the alkali solution injected from the inner pipe will be spread while going downward, and so the forward end portion of the outer pipe hardly will be exposed to the alkali atmosphere.

The alkali solution such as sodium hydroxide injected from the inner pipe neutralizes the acid hot-water stored in the acid geothermal well, and the neutralized hot-water is allowed to ascend via the first gap between the casing pipe and the duplex pipe to let the hot-water spout above to the ground, thus recovering flashing steam.

According to the multiplex pipe of the present embodiment, it includes the duplex pipe as a so-called neutralization pipe for a geothermal well, and includes the inner pipe having alkali-resistance that protrudes from the outer pipe having acid-resistance, these pipes making up the duplex pipe, whereby the hollow of the inner pipe can be ensured so as to keep the continuous supplying of the alkali solution, and both of the resistance of the inner pipe and the outer pipe (one has alkali-resistance, and the other has acid-resistance) can be exerted sufficiently while solving the problem of degradation of the outer pipe due to the alkali solution.

The present invention relates to a system configured to recover steam from a geothermal well as well, and the system includes the multiplex pipe; and a delivery device configured to send out the duplex pipe into the geothermal well while holding a state where the forward end of the inner pipe protrudes from the forward end of the outer pipe in the duplex pipe.

The system of the present invention is configured to send out the duplex pipe into the casing pipe by the delivery device while holding the state where the forward end of the inner pipe protrudes from the forward end of the outer pipe.

Herein the delivery device is not limited especially, which may include a drum around which the duplex pipe is wound, and an actuator such as a motor that rotary-drives the drum, for example.

According to the finding of the present inventors, corrosion (degradation) of the outer pipe having acid-resistance typically precedes that of the inner pipe. Since the duplex pipe is sent out to the geothermal well and is kept at a predetermined depth while keeping the posture of the inner pipe protruding from the outer pipe when the duplex pipe is sent out originally, the outer pipe will be degraded before that of the inner pipe during the course of the operation, meaning that the protruding posture of the inner pipe can be always kept without relatively sliding the inner pipe to the outer pipe.

If the inner pipe or the outer pipe is degraded, the duplex pipe may be sent out to the well by the delivery device instead of pulling up the duplex pipe, whereby a forward end of the sound duplex pipe without degradation can be always positioned at a desired depth.

Further there is no need to pull up the duplex pipe, if it is degraded, above to the ground for maintenance and insert it to the well again, and so the cost required for the maintenance can be remarkably reduced.

Advantageous Effects of Invention

As can be understood from the above description, according to the multiplex pipe configured to recover steam from a geothermal well of the present invention and a system provided with such a multiplex pipe, since the multiplex pipe includes the casing pipe located outside and the duplex pipe including the outer pipe having acid-resistance and the inner pipe having alkali-resistance, the hollow of the inner pipe can be ensured so as to keep the continuous supplying of the alkali solution, and both of the resistance of the inner pipe and the outer pipe can be exerted sufficiently.

DESCRIPTION OF EMBODIMENTS

Referring to the drawings, the following describes embodiments of a multiplex pipe of the present invention configured to recover steam from a geothermal well, and a system including such a multiplex pipe.

(Embodiment 1 for Multiplex Pipe and System)

Figure 1:
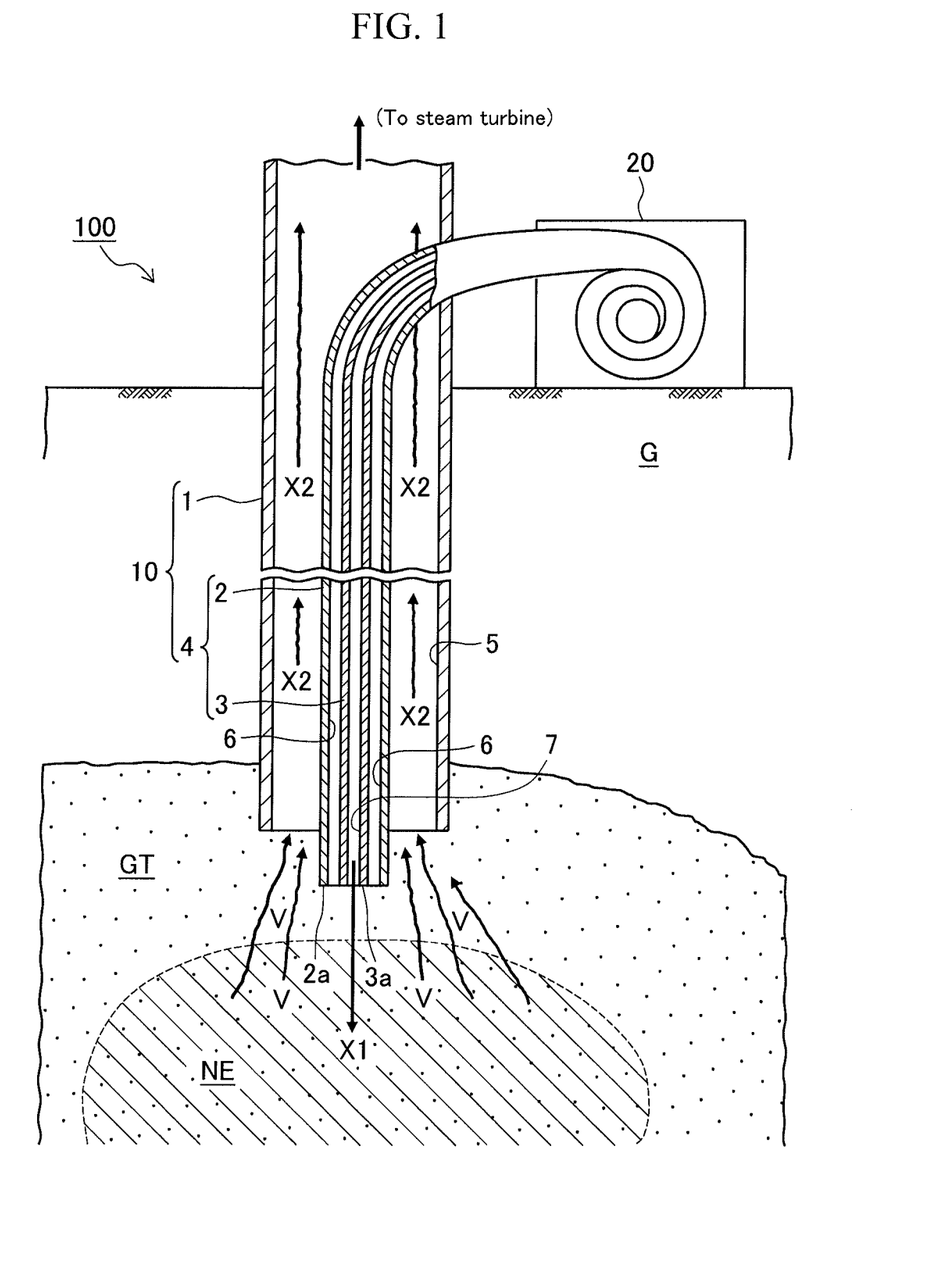
FIG. 1 schematically illustrates Embodiment 1 for a multiplex pipe of the present invention and Embodiment 1 for a system including such a multiplex pipe.

FIG. 1 schematically illustrates Embodiment I for a multiplex pipe of the present invention and a system including such a multiplex pipe. A system 100 illustrated in the drawing roughly includes a multiplex pipe 10 that extends to a strong-acid geothermal well GT located at depths of 2,000 m and below the ground G, and a delivery device 20 including a duplex pipe 4 making up the multiplex pipe 10 that is wound therearound, the delivery device being configured to send out the duplex pipe as needed. Although not illustrated, the duplex pipe 10 is provided with a master valve at a part thereof above the ground, and the duplex pipe above the master valve is branched off into two parts, one of which is connected to a pipe line directed to vapor-liquid separation via the valve, and the other includes the duplex pipe 4 extending upward via a top valve. Such a duplex pipe 4 extending upward via the top valve leads to the delivery device 20 via one or two or more pulleys.

The multiplex pipe 10 includes a casing pipe 1 located outside, which includes a steel pipe or the like, and a duplex pipe 4 that is slidable relative to the casing pipe 1 in the casing pipe 1 and has a first gap 5 with the inner face of the casing pipe 1. pipe 1.

The duplex pipe 4 includes an acid-resistant outer pipe 2 and an alkali-resistant inner pipe 3, where the outer pipe 2 and the inner pipe 3 define a second gap 6 therebetween. For instance, when the outer pipe 2 has an inner diameter of 50 mm or less, e.g., about 7 mm, the inner pipe 3 has an outer diameter of about 6 mm and a thickness of 0.2 mm or more, these inner and outer pipes have a gap can be ensured, keeping a sufficient escape route for permeated water of the alkali solution through the inner pipe 3. Note here that it is important for the "acid-resistant" and the "alkali-resistant" mentioned herein to have acid-resistance and alkali-resistance in a high-temperature environment at about 200 to 300° C. that is temperatures of geothermal wells.

Exemplary materials of the acid-resistant outer pipe 2 include titanium and an alloy thereof as well as Incoloy® 825 and Inconel® 625 having excellent heat resistance among Ni alloys, stainless steel, zirconium, and tantalum, among which titanium and an alloy thereof are preferable in terms of the material cost and their excellent heat and strong-acid resistance.

Exemplary materials of the alkali-aid inner pipe 3 include fluorine resins such as perfluoroalkoxy (PFA), perfluoroethylenepropylene (FEP) and polytetrafluoroethylene (PTFE), thermoplastic resins such as polyethylene (PE), polypropylene (PP) and polyimide (PI), and thermosetting resins such as phenol resin.

The delivery device 20 includes a drum around which the duplex pipe 4 is wound, and an actuator such as a motor that rotary-drives the drum, and is configured to send out the wound duplex pipe 4 downward in the casing pipe 1 by driving by the actuator until the forward end of the duplex pipe 4 reaches a position before the forward end of the casing pipe 1 or reaches a position such that it protrudes from the forward end of the casing pipe (illustrated example).

In the state where the duplex pipe 4 is sent out to a predetermined depth in the casing pipe 1, the first gap 5 is defined between the casing pipe 1 and the duplex pipe 4 to let generated steam flow above to the ground therethrough.

Then, the duplex pipe 4 is sent out while keeping the forward end 2a of the outer pipe 2 flush with the forward end 3a of the inner pipe 3 until the forward end of the duplex pipe 4 is provided at the location of a predetermined depth of the geothermal well GT.

An alkali solution is injected (X1 direction) to acid hot-water stored in the acid geothermal well GT via a hollow 7 of the inner pipe 3 from an alkali solution tank not illustrated, thus forming a neutralization area NE in the geothermal well GT. While this alkali solution is injected into the acid hot-water, the forward end of the duplex pipe 4 is positioned in the acid hot-water.

Then, the hot water V neutralized is allowed to ascend (X2 direction) from this neutralization area NE via the first gap 5 between the casing pipe 1 and the duplex pipe 4 to let the hot-water spout above to the ground, thus recovering steam that is obtained from flashing hot-water. Herein the liquid level as a flashing point is presented at a position on the way along the first gap 5.

If any one or both of the outer pipe 2 and the inner pipe 3 making up the duplex pipe 4 are degraded during the operation, the duplex pipe 4 is further sent out to the well by the delivery device 20 instead of pulling up the duplex pipe 4 for maintenance, whereby a forward end of the sound duplex pipe 4 can be positioned at a predetermined depth.

In this way, there is no need to pull up the duplex pipe 4, if it is degraded, to the ground for maintenance and then return it into the well again, and so such maintenance itself requiring the manpower and cost can be eliminated.

(Embodiment 2 for Multiplex Pipe and System)

Figure 2:
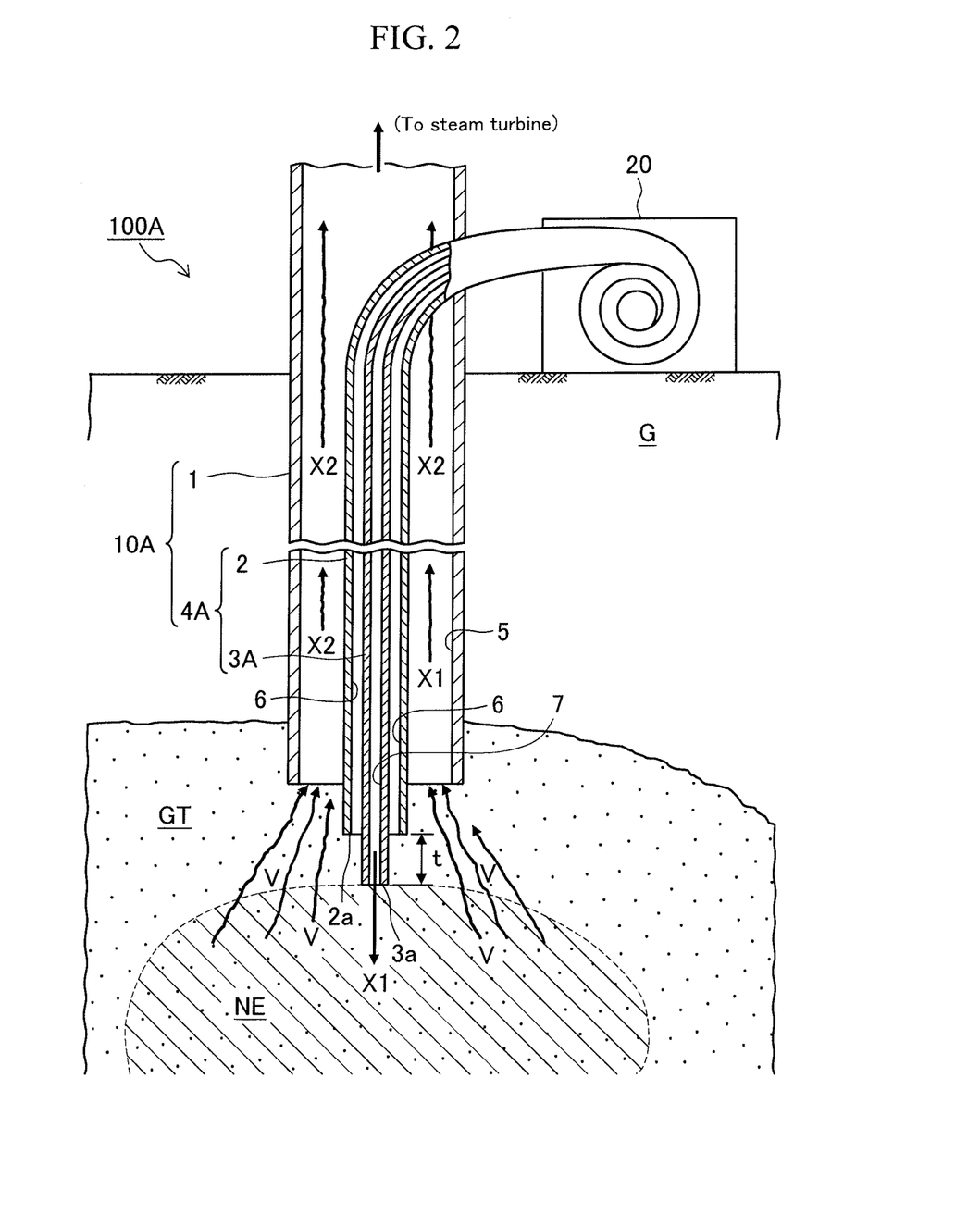
FIG. 2 schematically illustrates Embodiment 2 for a multiplex pipe of the present invention and Embodiment 2 for a system including such a multiplex pipe.

FIG. 2 schematically illustrates Embodiment 2 for a multiplex pipe of the present invention and a system including such a multiplex pipe. A system 100A illustrated in the drawing is different from the system 100 according to Embodiment 1 in that a duplex pipe 4A making up a multiplex pipe 10A in the system 100A includes an inner pipe 3A having a forward end 3a that protrudes from a forward end 2a of an outer pipe 2 by a predetermined length t.

This duplex pipe 4A is sent out while keeping the posture of the forward end 3a of the inner pipe 3A protruding from the forward end 2a of the outer pipe 2 by the predetermined length t, and in the illustrated state where the forward end of the duple pipe 4A is sent out to the position of a predetermined depth, the forward end of the duplex pipe 4A is provided in the geothermal well GT while letting the inner pipe 3A protrude from the outer pipe 2.

Whereas a geothermal fluid constituting a strong-acid geothermal well has a specific gravity of about 1.0 (about 0.968 at 100° C. and 0.85 at 200° C.) at normal temperatures, which varies with various ions and gases, an alkali solution containing sodium hydroxide and the like has a specific gravity of 1.525 at normal temperatures when the content of the solution is 50 mass %. In this way, the specific gravity of an alkali solution is relatively high. This means that, when the forward end 3a of the inner pipe 3A protrudes from the forward end 2a of the outer pipe 2 even slightly, the alkali solution injected from the inner pipe 3A will be spread while going downward, and so the forward end portion of the outer pipe 2 hardly will be exposed to the alkali atmosphere. As a result, the problem of corrosion of the outer pipe 2 due to the alkali solution can be solved effectively.

However, considering the variety of properties of the ground and modes in flow of a geothermal fluid, it is preferable to set the protruding length t at 20 mm or more, desirably at 50 mm or more.

Similarly to Embodiment 1, if any one or both of the outer pipe 2 and the inner pipe 3A making up the duplex pipe 4A are degraded during the operation, the duplex pipe 4A is further sent out to the well by the delivery device 20 instead of pulling up the duplex pipe 4A for maintenance, whereby a forward end of the sound duplex pipe 4A can be positioned at a predetermined depth. In this respect, according to the finding of the present inventors, corrosion (degradation) of the outer pipe 2 typically precedes that of the inner pipe 3A. Since the duplex pipe 4A is sent out to the geothermal well GT and is kept at a predetermined depth while keeping the posture of the inner pipe 3A protruding from the outer pipe 2 when the duplex pipe 4A is sent out originally, the outer pipe 2 will be degraded before that of the inner pipe 3A during the course of the operation, meaning that the protruding posture of the inner pipe 3A can be always kept without relatively sliding the inner pipe 3A to the outer pipe 2.

[Experiments to Confirm the Effectiveness of the Multiplex Pipes of the Present Invention, Experiments to Specify the Optimum Range of the Thickness of the Inner Pipe and their Results]

Figure 3:
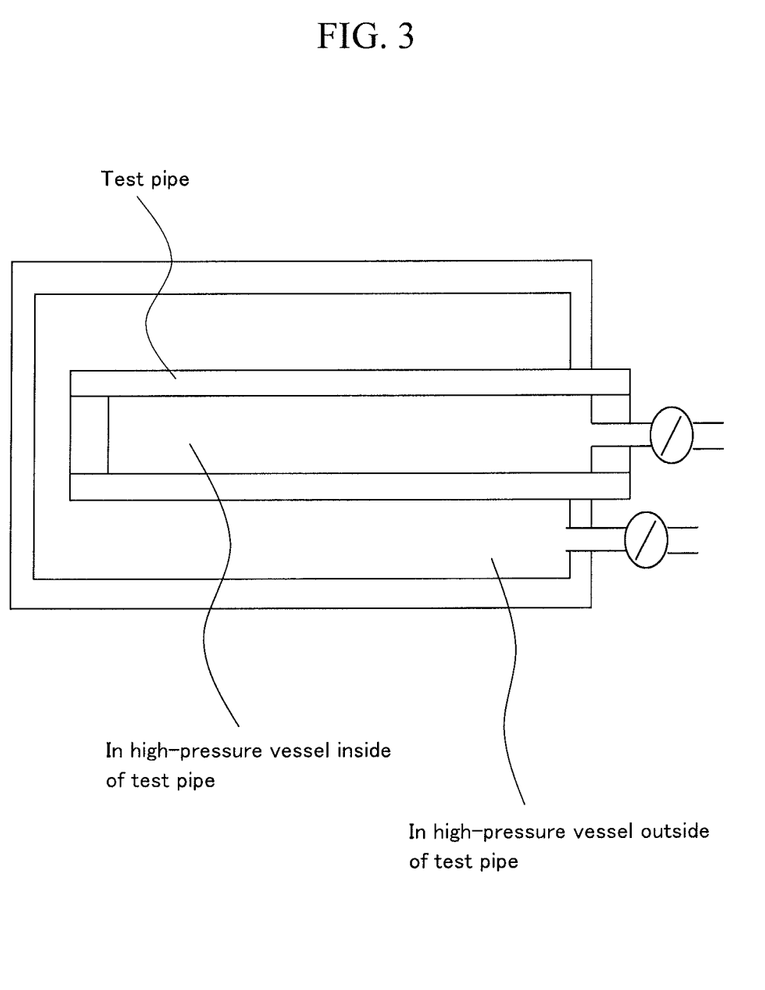
FIG. 3 describes the outline of a device that is used for experiments to confirm the effectiveness of the multiplex pipes of the present invention.

The present inventors conducted three types of experiments using the device schematically illustrated in FIG. 3 to confirm the effectiveness of the multiplex pipes of the present invention and to specify the optimum range of the thickness of the inner pipe.

[Test 1]

Using the device schematically illustrated in FIG. 3, corrosion solution containing Cl- of 30,000 ppm in HCl aqueous solution of pH 2 was poured outside a test pipe, which was sealed-heated to 250° C., thus preparing a high-temperature acid environment. Then aqueous solution containing sodium hydroxide whose pH was adjusted to 14 was poured inside the test pipe, which was heated to 250° C., thus preparing a high-temperature alkali environment. As illustrated in Table 1 in the below, two types of test pipes were prepared, having the outer face that was a metallic pipe of 10 mm in diameter and 1 mm in thickness, and the inner face, into which a fluorine resin pipe was inserted and was not inserted. After test for 168 hours, the corrosion state of the test pipes was observed, and Table 1 shows the results.

TABLE 1

| No | test pipes outer face | inner face | appearance of test pipes after 168 hours |
|---|---|---|---|
| 1 | titanium | 1 mm-thick fluorine resin (PFA) tube inserted | no corrosion found at both of inner and outer faces |
| 2 | Inconel ® 825 | 1 mm-thick fluorine resin (PFA) tube inserted | no corrosion found at inner face, corrosion found at outer face |
| 3 | SUS 316L | 1 mm-thick fluorine resin (PFA) tube inserted | no corrosion found at inner face, severe corrosion found at outer face |
| 4 | titanium | not treated | corrosion found at inner face, no corrosion found at outer face |
| 5 | Inconel ® 825 | not treated | corrosion found at inner face, corrosion found at outer face as well |
| 6 | SUS 316L | not treated | corrosion found at inner face, severe corrosion found at outer face |

In the high-temperature acid environment at the outer face of the test pipes, corrosion of titanium was not found, but severe corrosion was found in alloy 825 as a Ni alloy and SUS316L as a stainless steel material. In the high-temperature alkali environment at the inner face of the test pipes, any change from the initial state was not found for the test pipes including fluorine resin (PFA) and so favorite resistance was confirmed. When they did not include fluorine resin, corrosion was found for all of the cases of titanium, alloy 825 as a Ni alloy and SUS316L.

According to these test results, it was confirmed that the fluorine resin pipe inserted into titanium shows sufficient resistance in the high-temperature acid environment at the outer face and in the high-temperature alkali environment at the inner face.

[Test 2]

In a similar manner to Test 1, aqueous solution containing sodium hydroxide whose pH was adjusted to 14 was poured inside the test pipes, which was heated to 250° C., thus preparing a high-temperature alkali environment. In this test, the test pipes used were titanium pipes having their inner faces provided with fluorine resin coatings of different thicknesses. The thicknesses of fluorine resin were 0.1 mm, 0.2 mm, 0.5 mm and 1.0 mm. Table 2 below illustrates the results of the test.

TABLE 2

| No | test pieces | test results after 168 hours |
|---|---|---|
| 1 | coating 0.1 mm of fluorine resin on inner face of titanium pipe | break of fluorine coating found at an end part of test piece |
| 2 | coating 0.2 mm of fluorine resin on inner face of titanium pipe | swelling (peeling) from titanium found, no break found at fluorine coating material |
| 3 | coating 0.5 mm of fluorine resin on inner face of titanium pipe | same as above |
| 4 | coating 1.0 mm of fluorine resin on inner face of titanium pipe | same as above |

According to Table 2, swelling (peeling) of fluorine resin from titanium was found in any test piece, and a break of the coating was found for the thin coating of 0.1 mm in thickness. Any damage was not found for the coating of 0.2 mm or more in thickness.

[Test 3]

A fluorine resin pipe of 6 mm in outer diameter was inserted into a titanium pipe of 9 mm in outer diameter and 7 mm in inner diameter, which was disposed horizontally. The thicknesses of fluorine resin pipes were 0.1 mm, 0.2 mm, 0.5 mm and 1.0 mm. Table 3 below illustrates the results of the test.

TABLE 3

| No | thicknesses of fluorine resin pipe | results of insertion test of fluorine tube into titanium pipe |
|---|---|---|
| 1 | 0.1 mm | insertion only to 20 m, twisting occurred |
| 2 | 0.2 mm | insertion to 100 m, no twisting occurred |
| 3 | 0.5 mm | insertion to 100 m, no twisting occurred |
| 4 | 1.0 mm | insertion to 300 m, no twisting occurred |
| 5 | 1.0 mm | insertion to 3,000 m, no twisting occurred |

According to Table 3, the resin pipe of 1.0 mm in thickness was successively inserted to 3,000 m. However, the resin pipe of 0.1 mm in thickness was inserted only to 20 m, and the pipe tended to be blocked due to twisting or the like. This means a failure to configure a duplex pipe by the insertion of a fluorine resin pipe therein in that case.

That is a detailed description of the embodiments of the present invention. However, the specific configuration of the present invention is not limited to the above-stated embodiments, and the design may be modified variously without departing from the spirits of the present invention.

REFERENCE SIGNS LIST

1 Casing pipe
2 Outer pipe
2a Forward end of outer pipe
3, 3A Inner pipe
3a Forward end of inner pipe
4, 4A Duplex pipe
5 First gap
6 Second gap
7 Hollow of inner pipe
10, 10A Multiplex pipe
20 Delivery device
100, 100A System
G Ground
GT (Acid) geothermal well
NE Neutralization area
V Hot water

The invention claimed is:

1. A multiplex pipe configured to recover steam from a geothermal well, comprising:
   a casing pipe located outside; and
   a duplex pipe that is slidable relative to the casing pipe in the casing pipe, and has a first gap with an inner face of the casing pipe, the duplex pipe including an outer pipe formed from a pipe material having acid-resistance without the use of an acid-resistance coating and an inner pipe formed from a pipe material having alkali-resistance without the use of an alkali-resistance coating, the outer pipe and the inner pipe defining a second gap therebetween;
   wherein an alkali solution is injected to acid hot-water stored in an acid geothermal well via an interior of the inner pipe to neutralize the acid hot-water, and the neutralized hot-water is allowed to spout to the ground via the first gap, thus recovering flashing steam.

2. The multiplex pipe configured to recover steam from a geothermal well according to claim 1, wherein the outer pipe comprises an alloy containing titanium as a main component, and the inner pipe comprises a fluorine-based resin.

3. The multiplex pipe configured to recover steam from a geothermal well according to claim 1, wherein in the duplex pipe, a forward end of the inner pipe protrudes from a forward end of the outer pipe.

4. The multiplex pipe configured to recover steam from a geothermal well according to claim 1, wherein the alkali solution injected has a specific gravity larger than a specific gravity of the acid hot-water.

5. The multiplex pipe configured to recover steam from a geothermal well according to claim 1, wherein the outer pipe has an inner diameter of 50 mm or less, the inner pipe has a thickness of 0.2 mm or more, and the duplex pipe has a length of 2,000 to 3,000 m.

6. A system configured to recover steam from a geothermal well, comprising:
   the multiplex pipe according to claim 1; and
   a delivery device configured to send out the duplex pipe into the geothermal well while holding a state where the forward end of the inner pipe protrudes from the forward end of the outer pipe in the duplex pipe.

7. The multiplex pipe configured to recover steam from a geothermal well according to claim 2, wherein in the duplex pipe, a forward end of the inner pipe protrudes from a forward end of the outer pipe.

8. The multiplex pipe configured to recover steam from a geothermal well according to claim 2, wherein the alkali solution injected has a specific gravity larger than a specific gravity of the acid hot-water.

9. The multiplex pipe configured to recover steam from a geothermal well according to claim 3, wherein the alkali solution injected has a specific gravity larger than a specific gravity of the acid hot-water.

10. The multiplex pipe configured to recover steam from a geothermal well according to claim 2, wherein the outer pipe has an inner diameter of 50 mm or less, the inner pipe has a thickness of 0.2 mm or more, and the duplex pipe has a length of 2,000 to 3,000 m.

11. The multiplex pipe configured to recover steam from a geothermal well according to claim 3, wherein the outer pipe has an inner diameter of 50 mm or less, the inner pipe has a thickness of 0.2 mm or more, and the duplex pipe has a length of 2,000 to 3,000 m.

12. The multiplex pipe configured to recover steam from a geothermal well according to claim 4, wherein the outer pipe has an inner diameter of 50 mm or less, the inner pipe has a thickness of 0.2 mm or more, and the duplex pipe has a length of 2,000 to 3,000 m.

13. A system configured to recover steam from a geothermal well, comprising:
   the multiplex pipe according to claim 2; and
   a delivery device configured to send out the duplex pipe into the geothermal well while holding a state where the forward end of the inner pipe protrudes from the forward end of the outer pipe in the duplex pipe.

14. A system configured to recover steam from a geothermal well, comprising:
   the multiplex pipe according to claim 3; and
   a delivery device configured to send out the duplex pipe into the geothermal well while holding a state where the forward end of the inner pipe protrudes from the forward end of the outer pipe in the duplex pipe.

15. A system configured to recover steam from a geother-mal well, comprising:

the multiplex pipe according to claim 4; and a delivery device configured to send out the duplex pipe into the geothermal well while holding a state where the forward end of the inner pipe protrudes from the forward end of the outer pipe in the duplex pipe.

16. A system configured to recover steam from a geothermal well, comprising:

the multiplex pipe according to claim 5; and a delivery device configured to send out the duplex pipe into the geothermal well while holding a state where the forward end of the inner pipe protrudes from the forward end of the outer pipe in the duplex pipe.

17. The multiplex pipe configured to recover steam from a geothermal well according to claim 1, wherein a forward end of the inner pipe protrudes from a forward end of the outer pipe to define a protruding posture, and wherein the outer pipe degrades before degradation of the inner pipe, thereby maintaining the protruding posture of the inner pipe without sliding the inner pipe relative to the outer pipe.

18. The multiplex pipe configured to recover steam from a geothermal well according to claim 1, wherein the outer pipe degrades before degradation of the inner pipe.

19. The multiplex pipe configured to recover steam from a geothermal well according to claim 1, wherein the outer pipe degrades before degradation of the inner pipe, thereby maintaining a positional relationship of the inner pipe relative to the outer pipe.

\* \* \* \* \*